United States Patent [19]

Lienhard et al.

[11] 4,202,814

[45] May 13, 1980

[54] PROCESS FOR THE MASS COLORATION OF POLYESTERS

[75] Inventors: Paul Lienhard, Frenkendorf; Abul Iqbal, Ettingen, both of Switzerland

[73] Assignee: Ciba-Geigy Corporation, Ardsley, N.Y.

[21] Appl. No.: 861,327

[22] Filed: Dec. 16, 1977

[30] Foreign Application Priority Data

Dec. 27, 1976 [CH] Switzerland ............... 16350/76

[51] Int. Cl.² ............................................. C08K 5/23
[52] U.S. Cl. ................................. 260/40 P; 260/207.1
[58] Field of Search .................... 260/40 P, 187, 207.1

[56] References Cited

U.S. PATENT DOCUMENTS

| | | | |
|---|---|---|---|
| 2,571,319 | 10/1951 | Waters et al. | 260/40 P X |
| 3,712,882 | 1/1973 | Blackwell et al. | 260/187 |
| 3,821,194 | 6/1974 | Peter et al. | 260/207.1 X |
| 3,987,027 | 10/1976 | Brouard et al. | 260/187 X |
| 4,041,025 | 8/1977 | Maier et al. | 260/207.1 X |

FOREIGN PATENT DOCUMENTS

| | | |
|---|---|---|
| 2548479 | 5/1976 | Fed. Rep. of Germany . |
| 573959 | 3/1976 | Switzerland . |
| 1326941 | 8/1973 | United Kingdom . |
| 1330118 | 9/1973 | United Kingdom . |
| 1363128 | 8/1974 | United Kingdom . |

*Primary Examiner*—Sandra M. Person
*Attorney, Agent, or Firm*—Joseph F. DiPrima

[57] ABSTRACT

A process for the mass coloration of polyesters which comprises the use of a dye of the formula

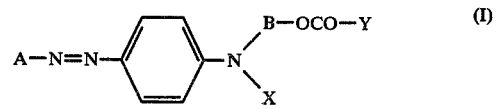

wherein
  B represents alkylene of 2 to 4 carbon atoms,
  Y represents cycloalkyl of 5 to 6 carbon atoms, aralkyl of 7 to 14 carbon atoms or a substituted or unsubstituted carbocyclic or heterocyclic aromatic radical,
  X represents cyanoalkyl of 1 to 5 carbon atoms or —B—OCO—Y, and
  A represents an aromatic radical of the formula

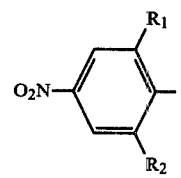

wherein $R_1$ represents halogen, cyano, trifluoromethyl or alkylsulphonyl of 1 to 4 carbon atoms, and $R_2$ represents hydrogen or halogen, or represents the group

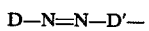

in which D and D' represent substituted or unsubstituted phenyl or naphthyl radicals.

2 Claims, No Drawings

PROCESS FOR THE MASS COLORATION OF POLYESTERS

The present invention relates to the mass colouration of polyester with selected azo dyes which are soluble in the substrate and possess sufficient thermostability as well as good fastness properties.

Only a limited number of dyes which are normally used for colouring plastics are suitable for the mass colouration of polyesters, namely only those which do not suffer any impairment of their fastness properties or other desired properties as a consequence of the high temperatures of 290° to 300° C. when they are used in the condensation melt or before the polyesters are spun.

Processes for colouring plastic masses which melt at high temperatures, including also polyesters, are already known, for example from German Offenlegungsschrift No. 2,548,479 and Swiss patent specification No. 573,959.

It has now been found that, when mass dyeing linear polyesters, particularly good thermostability is ensured by using dyes of the formula

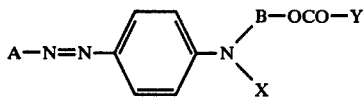

wherein

B represents alkylene of 2 to 4 carbon atoms,

Y represents cycloalkyl of 5 to 6 carbon atoms, aralkyl of 7 to 14 carbon atoms, or a substituted or unsubstituted carbocyclic or heterocyclic aromatic radical, X represents cyanoalkyl of 1 to 5 carbon atoms or —B—OCO—Y, and A represents an aromatic radical of the formula

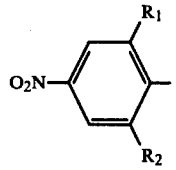

wherein $R_1$ represents halogen, cyano, trifluoromethyl or alkylsulphonyl of 1 to 4 carbon atoms, and $R_2$ represents hydrogen or halogen, or represents the group

in which D and D' represent substituted or unsubstituted phenyl or naphthyl radicals.

Interesting dyes are in particular those of the formula

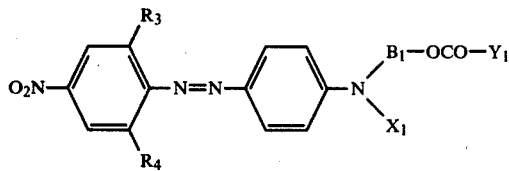

wherein $R_3$ represents halogen, cyano, trifluoromethyl or alkylsulphonyl of 1 to 4 carbon atoms, $R_4$ represents hydrogen or halogen, $B_1$ represents alkylene of 2 to 4 carbon atoms, $Y_1$ represents cycloalkyl of 5 to 6 carbon atoms, aralkyl of 7 to 14 carbon atoms, a phenyl radical which is unsubstituted or substituted by halogen, alkyl of 1 to 4 carbon atoms, alkoxy of 1 to 4 carbon atoms, nitro, alkoxycarbonyl of 2 to 6 carbon atoms, alkanoyloxy of 2 to 5 carbon atoms, phenoxycarbonyl, chlorophenoxycarbonyl, methylphenoxycarbonyl, benzoyloxy, chlorobenzoyloxy, toluyloxy, phenyl, phenoxy, benzoyl, carboxyl or cyano; a naphthyl radical which is unsubstituted or substituted by halogen, alkyl of 1 to 4 carbon atoms, alkoxycarbonyl of 2 to 6 carbon atoms, alkanoyloxy of 2 to 5 carbon atoms, phenoxycarbonyl, chlorophenoxycarbonyl, methylphenoxycarbonyl, benzoyloxy, chlorobenzoyloxy, toluyloxy; a pyridyl, thienyl or furyl radical; and $X_1$ represents cyanoalkyl of 1 to 5 carbon atoms or —$B_1$—OCO—$Y_1$.

Interesting dyes are also those of the formula

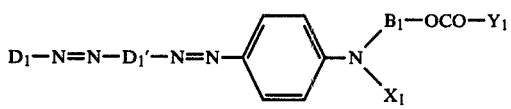

wherein $B_1$ represents alkylene of 2 to 4 carbon atoms, $Y_1$ represents cycloalkyl of 5 to 6 carbon atoms, aralkyl of 7 to 14 carbon atoms, a phenyl radical which is unsubstituted or substituted by halogen, alkyl of 1 to 4 carbon atoms, alkoxy of 1 to 4 carbon atoms, nitro, alkoxycarbonyl of 2 to 6 carbon atoms, alkanoyloxy of 2 to 5 carbon atoms, phenoxycarbonyl, chlorophenoxycarbonyl, methylphenoxycarbonyl, benzoyloxy, chlorobenzoyloxy, toluyloxy, carboxyl or cyano; a naphthyl radical which is unsubstituted or substituted by halogen, alkyl of 1 to 4 carbon atoms, alkoxycarbonyl of 2 to 6 carbon atoms, alkanoyloxy of 2 to 5 carbon atoms, phenoxycarbonyl, chlorophenoxycarbonyl, methylphenoxycarbonyl, benzoyloxy, chlorobenzoyloxy, toluyloxy; a pyridyl, thienyl or furyl radical, $X_1$ represents cyanoalkyl of 2 to 5 carbon atoms or —$B_1$—OCO—$Y_1$, $D_1$ represents a phenyl radical which can be mono- or disubstituted by halogen, alkyl of 1 to 4 carbon atoms, alkoxy of 1 to 4 carbon atoms, alkoxycarbonyl of 2 to 6 carbon atoms, alkanoyloxy of 2 to 5 carbon atoms, phenoxycarbonyl, chlorophenoxycarbonyl, methylphenoxycarbonyl, benzoyloxy, chlorobenzoyloxy, toluyloxy, which can themselves be substituted in the benzene ring by halogen or alkyl of 1 to 2 carbon atoms, carbamoyl, alkylcarbamoyl of 2 to 6 carbon atoms, phenylcarbamoyl, which can itself be substituted in the benzene ring by halogen, alkyl of 1 to 2 carbon atoms, alkoxy of 1 to 2 carbon atoms or trifluoromethyl, sulphamoyl, alkylsulphamoyl of 1 to 4 carbon atoms or phenylsulphamoyl, which can itself be substituted in the benzene ring by halogen, alkyl of 1 to 2 carbon atoms, alkoxy of 1 to 2 carbon atoms or trifluoromethyl, nitro, cyano or trifluoromethyl, and $D_1'$ represents a phenylene radical which can be mono- or disubstituted by halogen, alkyl of 1 to 4 carbon atoms, alkoxy of 1 to 4 carbon atoms, alkanoylamino of 2 to 6 carbon atoms or benzoylamino, which can itself be substituted in the benzene ring by halogen or alkyl of 1 to 2 carbon atoms, or represents a naphthylene radical which can be mono- or disubstituted by halogen, alkyl of 1 to 4 carbon atoms, sulphamoyl, alkylsulphamoyl of 1 to 4 carbon atoms or phenylsulphamoyl, which can itself be substituted in the benzene ring by halogen, alkyl of 1 to 2 carbon atoms, alkoxy of 1 to 2 carbon atoms or trifluoromethyl.

The halogen substituents are in particular chlorine or bromine.

Alkyl groups represented by $R_2$, $R_4$, $X$ and $X_1$ or which constitute possible substituents of other groups are for example methyl, ethyl, n-propyl, isopropyl, n-butyl or tert-butyl, but preferably methyl or ethyl.

Alkylsulphonyl represented by $R_1$ and $R_3$ is methylsulphonyl, ethylsulphonyl, n-propylsulphonyl, isopropylsulphonyl, n-butylsulphonyl, tert-butylsulphonyl, but preferably methyl- and ethylsulphonyl.

Alkylene represented by $B$ and $B_1$ is for example ethylene, n-propylene, isopropylene or n-butylene, but is preferably ethylene.

Cyanoalkyl represented by $X$ and $X_1$ is for example cyanomethyl, cyanoethyl, cyano-n-propyl, cyanoisopropyl, cyano-n-butyl, cyano-tert-butyl, but preferably cyanoethyl.

Cycloalkyl represented by $Y$ and $Y_1$ is cyclopentyl and, in particular, cyclohexyl.

Aralkyl represented by $Y$ and $Y_1$ is for example a phenalkyl radical of 7 to 10 carbon atoms which can be substituted in the benzene ring by halogen or alkyl of 1 to 4 carbon atoms, and is in particular benzyl, phenethyl, p-chloro- and p-methylbenzyl, p-chloro- and p-methylphenethyl.

Where $Y_1$ represents a phenyl radical substituted by alkoxycarbonyl, it is methoxycarbonylphenyl, especially however ethoxycarbonylphenyl, in which the alkoxycarbonyl group is preferably in the para-position.

Where $Y_1$ is a phenyl radical substituted by alkanoyloxy, it is an acetyloxyphenyl, propionyloxyphenyl, n-butyryloxyphenyl, isobutyryloxyphenyl, n-valeryloxyphenyl, isovaleryloxyphenyl radical, especially an acetyloxyphenyl radical, in which the alkanoyloxy group is preferably in the para-position.

Where $Y_1$ is a naphthyl radical substituted by alkoxycarbonyl, it is a methoxycarbonylnaphthyl radical, especially an ethoxycarbonylnaphthyl radical, the alkoxycarbonyl group being preferably in the 4-position of a naphthyl-1 radical.

Preferably, $Y_1$ is phenyl, p-methoxyphenyl or p-chlorophenyl.

Where $D_1$ is a phenyl radical substituted by alkoxycarbonyl, it is for example methoxy-, dimethoxy-, ethoxy-, diethoxy-, n-propoxy-, tert-butoxy-, n-pentoxycarbonylphenyl, but is preferably methoxy- or dimethoxycarbonylphenyl, the alkoxycarbonyl groups being preferably in the ortho- and/or 2,5-position.

Where $D_1$ is a phenyl radical substituted by phenoxycarbonyl, it is for example p-chloro-phenoxycarbonylphenyl, p-methyl-phenoxycarbonylphenyl or p-ethyl-phenoxycarbonylphenyl, but preferably unsubstituted phenoxycarbonylphenyl, the phenoxycarbonyl group being preferably in the ortho- or para-position.

Where $D_1$ is a phenyl radical substituted by alkylcarbamoyl, it is for example methylcarbamoylphenyl, ethylcarbamoylphenyl, isopropylcarbamoylphenyl, tert-butylcarbamoylphenyl or n-pentylcarbamoylphenyl, but preferably methylcarbamoylphenyl. The alkylcarbamoyl group is preferably in the ortho- or para-position.

Where $D_1$ is a phenyl radical substituted by a phenylcarbamoyl group, it is for example tolylcarbamoylphenyl, ethylphenylcarbamoylphenyl, methoxyphenylcarbamoylphenyl, ethoxyphenylcarbamoylphenyl, chlorophenylcarbamoylphenyl, trifluoromethanephenylcarbamoylphenyl, but is in particular unsubstituted phenylcarbamoylphenyl. The respective substituents are preferably in the ortho- or para-position in both phenyl radicals.

Where $D_1$ is a phenyl radical substituted by an alkylsulphamoyl group, it is for example methylsulphamoylphenyl, ethylsulphamoylphenyl, n-propylsulphamoylphenyl, isopropylsulphamoylphenyl, n-butylsulphamoylphenyl, tert-butylsulphamoylphenyl, but is preferably methylsulphamoylphenyl. The alkylsulphamoyl group is preferably in the ortho- or para-position.

Where $D_1$ is a phenyl radical substituted by a phenylsulphamyol group, it is for example chlorophenylsulphamoylphenyl, tolylsulphamoylphenyl, ethylphenylsulphamoylphenyl, methoxyphenylsulphamoylphenyl, ethoxyphenylsulphamoylphenyl, trifluoromethylphenylsulphamoylphenyl, but is preferably unsubstituted phenylsulphamoylphenyl. The respective substituents are preferably in the para-position in both phenyl radicals.

Where $D_1$ represents nitrophenyl which can be substituted by a further substituent, the nitro group is preferably in the para-position and the possible second substituent is in the ortho-position.

Preferably, $D_1$ is 2-chloro-4-nitrophenyl, 2-cyano-4-nitrophenyl, but especially 2-trifluoromethyl-4-nitrophenyl.

Where $D_1'$ is a phenylene radical substituted by alkanoylamino, it is for example acetylaminophenylene, propionylaminophenylene, n-butyrylaminophenylene, isobutyrylaminophenylene, n-valerylaminophenylene, trimethylacetylaminophenylene, but is preferably acetylaminophenylene.

Where $D_1'$ is a phenylene radical substituted by benzoylamino, it is for example chlorobenzoylaminophenylene, methylbenzoylaminophenylene, ethylbenzoylaminophenylene, but is preferably unsubstituted benzoylaminophenylene. Substituents present in the benzene ring of the benzoylamino group are preferably in the para-position.

A phenylene radical $D_1'$ is preferably a 1,4-phenylene radical which can be monosubstituted or disubstituted in the 2,5-position.

Where $D_1'$ is a naphthylene radical which is substituted by alkylsulphamoyl, it is for example methylsulphamoylnaphthylene, ethylsulphamoylnaphthylene, isopropylsulphamoylnaphthylene, n-butylsulphamoylnaphthylene, but is preferably methylsulphamoylnaphthylene.

Where $D_1'$ is a naphthylene radical which is substituted by phenylsulphamoyl, it is for example chlorophenylsulphamoylnaphthylene, tolylsulphamoylnaphthylene, ethylphenylsulphamoylnaphthylene, methoxyphenylsulphamoylnaphthylene, ethoxyphenylsulphamoylnaphthylene, trifluoromethylsulphamoylnaphthylene, but is preferably unsubstituted phenylsulphamoylnaphthylene. Substituents present in the benzene ring of the phenylsulphamoyl radical are preferably in the para-position.

A naphthylene radical represented by $D_1'$ is preferably a 1,4-naphthylene radical which can be substituted in the 2-, 5-, 6-, 7- or 8-position.

Preferably $D_1'$ is unsubstituted 1,4-phenylene or 1,4-naphthylene.

Preferred dyes are those of the formula

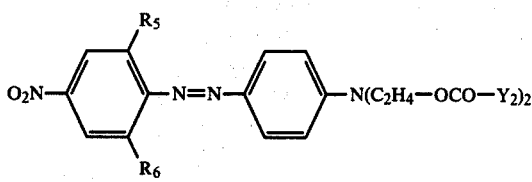

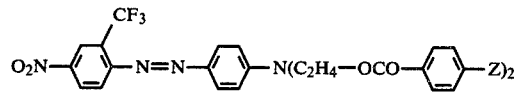

wherein Z represents hydrogen, chlorine, methyl or methoxy, and also those of the formula

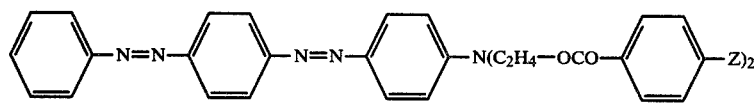

wherein Z represents hydrogen, chlorine, methyl or methoxy.

The dyes of the present invention can be obtained by known methods by diazotising an amine of the formula

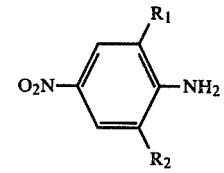

wherein $R_1$ and $R_2$ have the meanings given above, or of the formula $$D-N=N-D'-NH_2$$

or of the formula

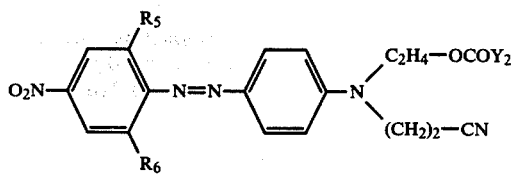

wherein $R_5$ represents chlorine, cyano or trifluoromethyl,
$R_6$ represents hydrogen or chlorine,
$Y_2$ represents a phenyl radical which is unsubstituted or substituted by chlorine, methyl, methoxy, nitro, ethoxycarbonyl, phenoxycarbonyl, carboxyl or cyano, or a naphthyl-1 radical which is unsubstituted or substituted in the 4-position by chlorine, methyl, methoxycarbonyl or phenoxycarbonyl.

Preferred dyes are also those of the formula

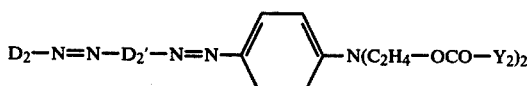

or of the formula

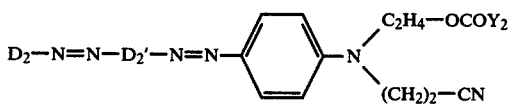

wherein $D_2$ represents a phenyl radical which can be substituted by chlorine, methyl, methoxy, methoxycarbonyl, phenoxycarbonyl, carbamoyl, sulphamoyl, nitro, cyano or trifluoromethyl,
$D_2'$ represents a phenylene or naphthylene radical,
$Y_2$ represents a phenyl radical which can be substituted in the para-position by chlorine, methyl, methoxy, nitro, ethoxycarbonyl, phenoxycarbonyl, carboxyl or cyano, or a naphthyl-1 radical which is unsubstituted or substituted in the 4-position by chlorine, methyl, methoxycarbonyl or phenoxycarbonyl.

Particularly preferred dyes are those of the formula wherein D and D' have the above meanings, and coupling the resulting diazonium salt in the ratio 1:1 either direct with a compound of the formula

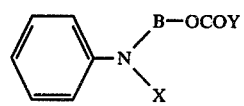

wherein B and Y have the above meanings, or firstly with a compound of the formula

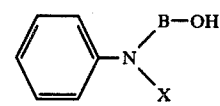

and subsequently acylating with the corresponding acid of the formula Y-COOH. All the starting materials are known.

Suitable linear polyesters are in particular those which are obtained by polycondensation of terephthalic acid or an ester thereof with a glycol of the formula HO—$(CH_2)_n$—OH, in which n is an integer from 2 to 10, or with 1,4-di(hydroxymethyl)cyclohexane, or by polycondensation of a glycol ether of a hydroxybenzoic acid, for example p-($\beta$-hydroxyethoxy)benzoic acid. The term "linear polyesters" also comprises copolyesters which are obtained by partial replacement of terephthalic acid by another dicarboxylic acid and/or by partial replacement of glycol by another diol. However the preferred linear polyesters are polyethylene terephthalates.

The linear polyesters to be coloured are preferably homogeneously mixed with the dye in the form of powders, chips or granules. This can be accomplished for example by coating the polyester particles with the finely divided dry dyestuff powder or by treating the polyester particles with a solution or dispersion of the dye in an organic solvent and subsequently removing this latter.

The dyes of the present invention can also be incorporated into those preparations for colouring polyester in the melt which are described in British patent specification No. 1,398,352.

Finally, the substrate to be coloured can also be added direct to the polyester melt or also before or during the polycondensation.

Depending on the desired colour strength, the ratio of dye to polyester can vary within wide limits. In general, it is advisable to use 0.01 to 3 parts by weight of dye to 100 parts by weight of polyester.

The treated polyester particles are fused by known methods in an extruder and pressed to objects, in particular sheets or filaments, or cast to boards.

The clear orange to blue colourations obtained are distinguished by pronounced colour strength and brilliance and by excellent fastness to light, rubbing, heat, sublimation, thermofixation and wet and dry cleaning, as well as by good transparency and resistance to alkali.

The invention is illustrated by the following Examples, in which the parts are by weight.

EXAMPLE 1

Non-delustered polyethylene terephthalate granules suitable for fibre manufacture are shaken for 15 minutes on a mechanical shaker with 1% of a finely sieved azo dye of the formula

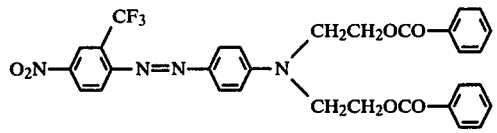

The granule particles are then spun in a melt spinning machine (285°±3° C., sojourn time in the spinning machine about 5 minutes) to filaments which are stretched and wound on a draw twister. A red colouration of very good fastness to light, washing, dry cleaning, cross dyeing, dry heat, thermofixation and rubbing is obtained.

Good colourations are also obtained by carrying out the above procedure using one of the dyes listed in Tables 1 and 2 instead of the above azo dye.

Table 1

| Example | $R_1$ | $R_2$ | —B—OCO—Y | X | Shade |
|---|---|---|---|---|---|
| 2 | Cl | Cl | —CH$_2$—CH$_2$OCO—C$_6$H$_5$ | —CH$_2$CH$_2$OCO—C$_6$H$_5$ | orange |
| 3 | CF$_3$ | H | —CH$_2$CH$_2$OCO—C$_6$H$_4$—C$_6$H$_5$ | —CH$_2$CH$_2$OCO—C$_6$H$_4$—C$_6$H$_5$ | red |
| 4 | Cl | Cl | —CH$_2$CH$_2$OCO—C$_6$H$_5$ | —CH$_2$CH$_2$CN | orange |
| 5 | Cl | H | " | " | scarlet |
| 6 | SO$_2$CH$_3$ | H | " | —CH$_2$CH$_2$OCO—C$_6$H$_5$ | red |
| 7 | Cl | H | " | " | red |
| 8 | Cl | H | —CH$_2$CH$_2$OCO—C$_6$H$_4$—OCH$_3$ | —CH$_2$CH$_2$OCO—C$_6$H$_4$—OCH$_3$ | red |
| 9 | CF$_3$ | H | " | " | red |
| 10 | CF$_3$ | H | —CH$_2$CH$_2$OCO—C$_6$H$_4$—Cl | —CH$_2$CH$_2$OCO—C$_6$H$_4$—Cl | red |

Table 1-continued

Structure:

$$O_2N-\text{(phenyl with } R_1, R_2\text{)}-N=N-\text{(phenyl)}-N(X)(B-OCO-Y)$$

| Example | R₁ | R₂ | —B—OCO—Y | X | Shade |
|---|---|---|---|---|---|
| 11 | CF₃ | H | —CH₂CH₂OCO—(2-methylphenyl) | —CH₂CH₂OCO—(2-methylphenyl) | red |
| 12 | CF₃ | H | —CH₂CH₂OCO—(2,5-dichlorophenyl) | —CH₂CH₂OCO—(2,5-dichlorophenyl) | red |
| 13 | CN | H | —CH₂CH₂OCO—(phenyl) | —CH₂CH₂OCO—(phenyl) | red |
| 14 | CF₃ | H | —CH₂CH₂OCO—(cyclohexyl) | —CH₂CH₂OCO—(cyclohexyl) | red |
| 15 | CF₃ | H | —CH₂CH₂OCOCH₂—(phenyl) | —CH₂CH₂OCOCH₂—(phenyl) | red |
| 16 | CF₃ | H | —CH₂CH₂OCO—(2,4-dichlorophenyl) | —CH₂CH₂OCO—(2,4-dichlorophenyl) | red |

Table 2

Structure: D—N=N—D′—N=N—(phenyl)—N(X)(B—OCO—Y)

| Example | D | D′ | —B—OCO—Y | X | Shade |
|---|---|---|---|---|---|
| 17 | phenyl | 1,4-phenylene | —CH₂CH₂OCO—(phenyl) | —CH₂CH₂CN | orange |
| 18 | " | " | " | —CH₂CH₂OCO—(phenyl) | orange |
| 19 | " | " | —CH₂CH₂OCO—(4-methoxyphenyl) | —CH₂CH₂OCO—(4-methoxyphenyl) | orange |
| 20 | 4-chlorophenyl | 1,4-naphthylene | —CH₂CH₂OCO—(phenyl) | —CH₂CH₂OCO—(phenyl) | red |

Table 2-continued

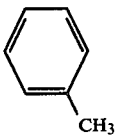

| Example | D | D' | −B−OCO−Y | X | Shade |
|---|---|---|---|---|---|
| 21 | (phenyl-CH₃) | | −CH₂CH₂OCO−(phenyl)−Cl | −CH₂CH₂OCO−(phenyl)−Cl | red |

EXAMPLE 22

72 parts of the monoazo dye of the formula

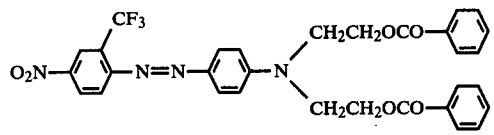

and 108 parts of a polyester (e.g. of the linear thermoplastic copolyester Dynapol L 206, marketed by Dynamit Nobel) are processed for half an hour at 100° to 130° C. in a laboratory kneader. When a homogeneous mixture is obtained, the cooled brittle product is ground, giving a preparation which contains 40% of dye. This preparation is fused in a extruder and shaped to cords of 3 mm diameter which are chopped in a cutting machine to cylindrical granules having a length of 3 mm. These granules are especially suitable for the mass colouration of polyester fibres.

EXAMPLE 23

487.5 parts of polyethylene terephthalate granules are mixed with 12.5 parts of the dyestuff preparation granules described in Example 22 by shaking in a closed vessel or on a roller gear table. The resulting mixture of uncoloured polyethylene terephthalate and preparation granules is dried for about 48 hours at 60° to 70° C. and under a pressure of about 0.5 torr and then spun to polyester continuous primary filaments in an extruder melt spinning machine (Inventa type) at a spinning temperature of 290° C., with a sojourn time of about 10 minutes and at a drawing rate of 300 m/min using a nozzle (24 holes having a diameter of 0.35 mm). These filaments are subsequently stretched on a draw twister at 100° C. godet temperature in the ratio 1:4.022). The fibre properties are essentially the same as those of undyed fibres.

What is claimed is:

1. A process for the mass coloration of polyesters which comprises homogeneously mixing a dye of the formula

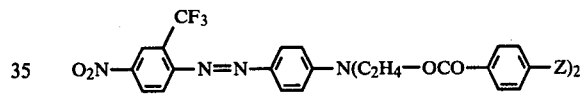

wherein Z represents hydrogen, chlorine, methyl or methoxy, with said polyester.

2. The coloured polyesters obtained according to claim 1.

* * * * *